(12) United States Patent
Tanaka et al.

(10) Patent No.: US 7,824,109 B2
(45) Date of Patent: Nov. 2, 2010

(54) OPTICAL CONNECTOR

(75) Inventors: Hiroshi Tanaka, Tsukuba (JP); Mitsuo Kama, Tsukuba (JP); Hiroshi Aoyama, Tusukuba (JP); Yasuo Oda, Tsukuba (JP); Ryo Nagase, Atsugi (JP); Hideki Ishihara, Tokyo (JP); Fumihiro Ashiya, Tokyo (JP); Shinichi Iwano, Tokyo (JP)

(73) Assignees: Nippon Telegraph and Telephone Corporation, Tokyo (JP); NTT Advanced Technology Corporation, Tokyo (JP)

( * ) Notice: Subject to any disclaimer, the term of this patent is extended or adjusted under 35 U.S.C. 154(b) by 12 days.

(21) Appl. No.: 11/990,026

(22) PCT Filed: Aug. 30, 2006

(86) PCT No.: PCT/JP2006/317140
§ 371 (c)(1),
(2), (4) Date: Apr. 16, 2008

(87) PCT Pub. No.: WO2007/026786
PCT Pub. Date: Mar. 8, 2007

(65) Prior Publication Data
US 2008/0273842 A1    Nov. 6, 2008

(30) Foreign Application Priority Data
Aug. 31, 2005   (JP) ............................. 2005-250791

(51) Int. Cl.
*G02B 6/38*   (2006.01)
(52) U.S. Cl. .......................................... 385/60; 385/92
(58) Field of Classification Search .................... 385/59, 385/60, 76, 78, 139
See application file for complete search history.

(56) References Cited
U.S. PATENT DOCUMENTS
2,287,319 A * 6/1942 Miller ......................... 166/170

2,580,682 A * 1/1952 Kraft et al. .................. 439/219
(Continued)

FOREIGN PATENT DOCUMENTS
JP          56-151909 A       11/1981
(Continued)

OTHER PUBLICATIONS

Dye, U.S. Appl. No. 60/636,879, Dec. 20, 2004. Incorporated into Dye, U.S. Patent Publication 2006/0171640.*
F04 Type connectors for optical fibre cables, Japanese Industrial Standards JIS C 5973, 2005, pp. 598-634.

*Primary Examiner*—Charlie Peng
*Assistant Examiner*—Peter Radkowski
(74) *Attorney, Agent, or Firm*—Birch, Stewart, Kolasch & Birch, LLP

(57) ABSTRACT

An optical connector comprising: first and second movable members 7, 8 held on an optical connector body 6 to be axially movable in a longitudinal direction; locking means for locking the first and second movable members when the first movable member is located at a predetermined locking position in a tip part of the optical connector body, and integrally moving the first and second movable members; and unlocking means formed in the optical connector body 6, and including a locking acting portion which acts on the locking means when the first movable member is located rearwardly of a predetermined unlocking position in a rear part of the optical connector body, to unlock the first and second movable members, and which locks the first and second movable members when the first movable member is located forwardly of the unlocking position, and a second movable member hooking portion 10 for inhibiting rearward movement of the second movable member after the first and second movable members are unlocked, and wherein the second movable member has a functional portion having a predetermined function, and when the second movable member is located at a predetermined position in the optical connector body, the function acts on a ferrule 2 or an optical fiber 1 to fulfill the function.

17 Claims, 11 Drawing Sheets

U.S. PATENT DOCUMENTS

| | | | |
|---|---|---|---|
| 4,182,546 A * | 1/1980 | Lukas et al. | 385/59 |
| 4,490,007 A * | 12/1984 | Murata | 385/64 |
| 4,645,295 A * | 2/1987 | Pronovost | 385/55 |
| 4,673,242 A | 6/1987 | Logan et al. | |
| 4,684,210 A * | 8/1987 | Matsunaga et al. | 385/88 |
| 4,787,706 A * | 11/1988 | Cannon et al. | 385/59 |
| 4,802,725 A * | 2/1989 | Borne et al. | 385/89 |
| 4,832,516 A * | 5/1989 | Nagasawa et al. | 400/124.26 |
| 5,348,487 A * | 9/1994 | Marazzi et al. | 439/138 |
| 5,379,362 A * | 1/1995 | Kawamura | 385/92 |
| 5,452,391 A * | 9/1995 | Chou et al. | 385/92 |
| 5,619,604 A * | 4/1997 | Shiflett et al. | 385/59 |
| 5,732,175 A * | 3/1998 | Fan | 385/87 |
| 5,778,130 A * | 7/1998 | Walters et al. | 385/134 |
| 5,796,898 A * | 8/1998 | Lee | 385/78 |
| 5,883,995 A * | 3/1999 | Lu | 385/60 |
| 5,909,526 A * | 6/1999 | Roth et al. | 385/78 |
| 5,984,531 A * | 11/1999 | Lu | 385/60 |
| 6,006,768 A * | 12/1999 | Cox | 134/200 |
| 6,076,973 A * | 6/2000 | Lu | 385/60 |
| 6,079,881 A * | 6/2000 | Roth | 385/76 |
| 6,081,647 A * | 6/2000 | Roth et al. | 385/139 |
| 6,083,030 A * | 7/2000 | Wright | 439/352 |
| 6,125,227 A * | 9/2000 | Cox | 385/134 |
| 6,142,676 A * | 11/2000 | Lu | 385/60 |
| 6,149,473 A * | 11/2000 | Lalange et al. | 439/752 |
| 6,296,398 B1 * | 10/2001 | Lu | 385/60 |
| 6,302,591 B1 * | 10/2001 | Nagaoka et al. | 385/59 |
| 6,464,408 B1 * | 10/2002 | Nolan | 385/87 |
| 6,466,366 B1 * | 10/2002 | Dominique | 359/379 |
| 6,471,416 B2 * | 10/2002 | Lu | 385/60 |
| 6,533,468 B2 * | 3/2003 | Nakajima et al. | 385/78 |
| 6,554,487 B2 * | 4/2003 | Nolan | 385/78 |
| 6,565,265 B2 * | 5/2003 | Ohtsuka et al. | 385/78 |
| 6,604,867 B2 * | 8/2003 | Radek et al. | 385/81 |
| 6,641,424 B1 * | 11/2003 | Hanak et al. | 439/352 |
| 6,705,766 B2 * | 3/2004 | Lecomte et al. | 385/78 |
| 6,749,347 B1 * | 6/2004 | Ichihara et al. | 385/93 |
| 6,816,661 B1 * | 11/2004 | Barnes et al. | 385/134 |
| 6,832,858 B2 * | 12/2004 | Roth et al. | 385/71 |
| 6,910,807 B2 * | 6/2005 | Lu | 385/60 |
| 6,935,790 B2 * | 8/2005 | Ozaki | 385/78 |
| 6,945,702 B2 * | 9/2005 | Gherardini | 385/55 |
| 7,118,288 B2 * | 10/2006 | Lu | 385/60 |
| 7,156,560 B2 * | 1/2007 | Seeley | 385/59 |
| 7,189,008 B2 * | 4/2007 | Lu | 385/55 |
| 7,213,975 B2 * | 5/2007 | Khemakhem et al. | 385/75 |
| 7,246,950 B2 * | 7/2007 | Lu | 385/60 |
| 7,280,733 B2 * | 10/2007 | Larson et al. | 385/139 |
| 7,341,382 B2 * | 3/2008 | Dye | 385/78 |
| 7,346,254 B2 * | 3/2008 | Kramer et al. | 385/135 |
| 7,376,322 B2 * | 5/2008 | Zimmel | 385/135 |
| 7,376,323 B2 * | 5/2008 | Zimmel | 385/135 |
| 7,384,201 B2 * | 6/2008 | Lu | 385/60 |
| 7,390,203 B2 * | 6/2008 | Murano et al. | 439/138 |
| 7,393,143 B2 * | 7/2008 | Kato et al. | 385/73 |
| 7,393,144 B2 * | 7/2008 | Khemakhem et al. | 385/75 |
| 7,400,813 B2 * | 7/2008 | Zimmel | 385/135 |
| 7,418,181 B2 * | 8/2008 | Zimmel et al. | 385/135 |
| 2001/0043777 A1 * | 11/2001 | Lu | 385/60 |
| 2003/0021542 A1 * | 1/2003 | Lu | 385/60 |
| 2003/0077048 A1 * | 4/2003 | Radek et al. | 385/81 |
| 2003/0128938 A1 * | 7/2003 | Caveney | 385/81 |
| 2005/0111795 A1 * | 5/2005 | Gherardini | 385/55 |
| 2005/0169583 A1 * | 8/2005 | Lu | 385/59 |
| 2006/0171638 A1 * | 8/2006 | Dye | 385/78 |
| 2006/0171639 A1 * | 8/2006 | Dye | 385/78 |
| 2006/0171640 A1 * | 8/2006 | Dye | 385/78 |
| 2007/0086706 A1 * | 4/2007 | Lu | 385/55 |
| 2007/0104425 A1 * | 5/2007 | Larson et al. | 385/86 |
| 2007/0104445 A1 * | 5/2007 | Larson et al. | 385/134 |
| 2007/0206904 A1 * | 9/2007 | Sezerman et al. | 385/78 |
| 2007/0253666 A1 * | 11/2007 | Lu | 385/60 |

FOREIGN PATENT DOCUMENTS

| | | |
|---|---|---|
| JP | 58-122511 A | 7/1983 |
| JP | 6-11628 A | 1/1994 |
| JP | 7-281055 A | 10/1995 |
| JP | 2002-525650 A | 8/2002 |
| JP | 2005-77837 A | 3/2005 |

* cited by examiner

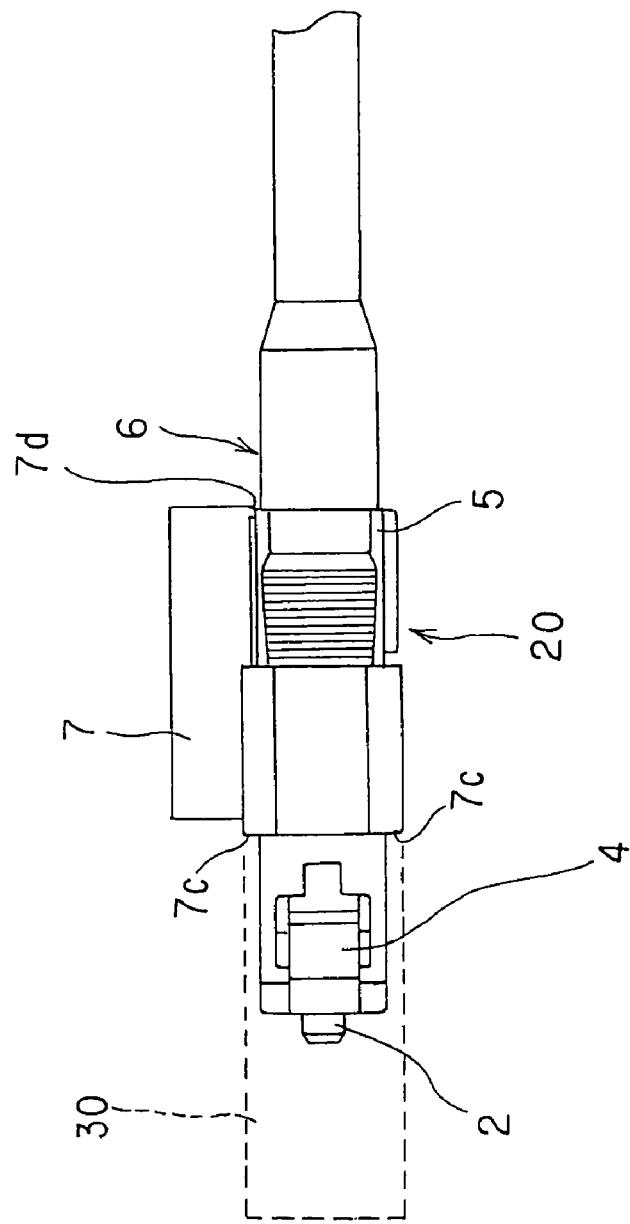
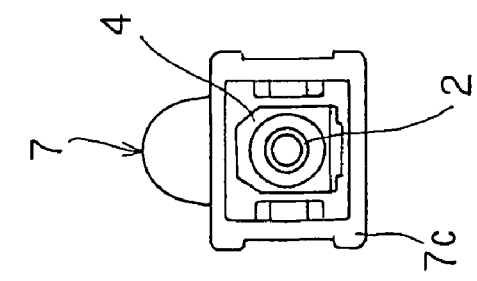
FIG.5B
FIG.5A

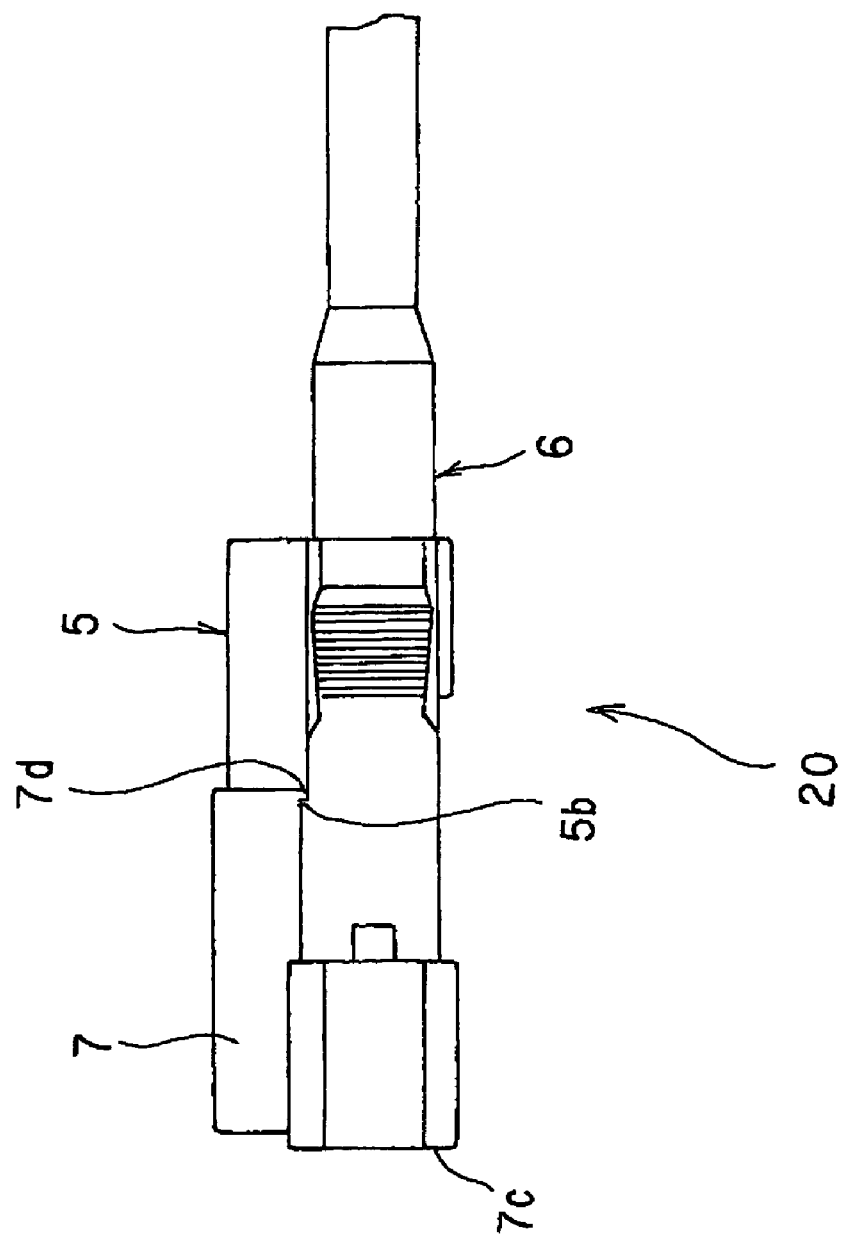
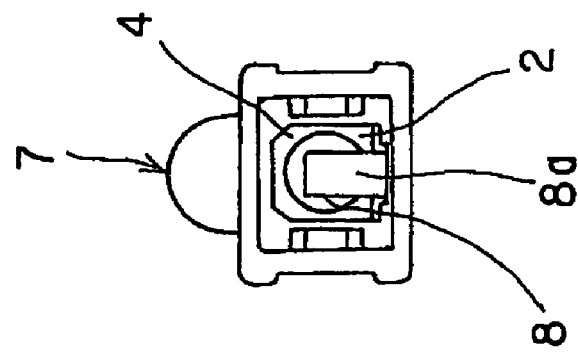

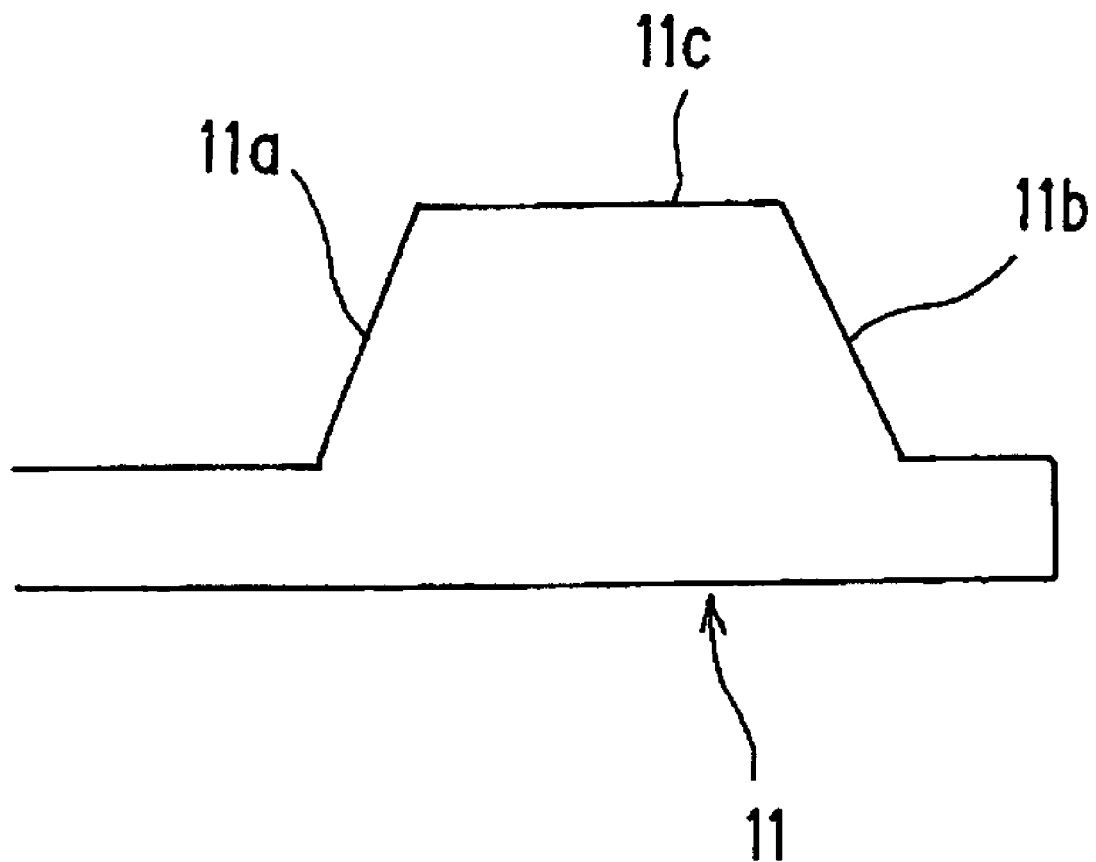

OPTICAL CONNECTOR

TECHNICAL FIELD

This invention relates to an optical connector applied in connecting various optical instruments for optical fiber telecommunications, connecting optical fibers, and connecting an optical instrument and an optical fiber. More particularly, the invention relates to an optical connector having a structure which can be applied when it is necessary to provide the optical connector with a function other than connecting optical fibers.

BACKGROUND ART

As the Internet has become widespread, the introduction of a telecommunications system, by which to dispose optical fibers between a telephone office and ordinary households, thereby enabling high speed interactive communications, is gaining momentum. With such a telecommunications system, a connecting member such as an optical connector or an optical receptacle is utilized in optically connecting optical fibers together or an optical fiber to an instrument in an optical transmission path.

As the above-mentioned optical connector, an F04-type optical connector or a so-called SC-type optical connector is known (see Non-Patent Document 1). As described in Non-Patent Document 1, the SC-type optical connector is an optical connector which can connect optical fibers with a small loss and reduced reflection. Not only such an optical connector, but also a conventional optical connector has the function of connecting optical fibers with a small loss and reduced reflection.

In recent years, with the expansion of the region of application of optical fiber telecommunications technologies, there has been a demand for realization of other functions of optical connectors in addition to the function of connecting optical fibers. These functions range widely according to the region of application of optical connectors and, for example, include the function of cleaning the end surface of the optical fiber of the optical connector, and the function of blocking light exiting from the end surface of the optical fiber when no optical connector is coupled to the optical fiber.

The above light blocking function has hitherto been often achieved, for example, by mounting the optical connector with a cap formed from rubber or the like. The cleaning function has generally been performed by using alcohol and a cleaning paper, or an optical connector cleaner. In this case, the cleaning paper wetted with alcohol, or a cleaning surface of the optical connector cleaner is pressed and rubbed against the end surface of a ferrule of the optical connector rid of the cap, whereby the end surface of the ferrule and the end surface of the optical fiber in the optical connector are cleaned. An optical connector having a light blocking mechanism described in Patent Document 1, for example, has been developed as the optical connector having the cleaning function.

Patent Document 1: Japanese Unexamined Patent Publication No. 2005-77837

Non-Patent Document 1: Japanese Industrial Standards JIS C 5973

DISCLOSURE OF THE INVENTION

Problems to be Solved by the Invention

In providing the optical connector itself with various functions, as stated above, and coupling it to a connecting member opposing it, such as an adapter or an optical receptacle, it is desired that these functions can be exhibited automatically. However, among the 14 types of optical connectors defined in the Japanese Industrial Standards (JIS), such as the F04-type optical connector, there have been no means preferred in automatically exhibiting such functions when the optical connector is coupled to the connecting member. Thus, a different member has to be used in performing the cleaning function and the light blocking function, and an operation for doing so has to be carried out separately from a connecting procedure.

The optical connector having the light blocking mechanism described in Patent Document 1 can block light by a shielding member. However, an abutment surface abutting on an inclined surface formed in the shielding member needs to be formed in the connecting member to which the optical connector is connected. Thus, the structure of the connecting member may be complicated.

The present invention has been proposed in the light of the above-described problems. It is an object of the invention to provide an optical connector which is allowed to automatically exhibit functions other than the function of coupling optical fibers when the optical connector is coupled to a connecting member; in detail, which is allowed to automatically exhibit desired functions, such as light blocking and cleaning, through coupling to or withdrawal from the connecting member, and which has a simple structure, when the optical connector is the F04-type optical connector or the like defined in the Japanese Industrial Standards.

Means for Solving the Problems

An optical connector according to a first aspect of the present invention, for solving the above problems, is an optical connector which has an optical connector body incorporating a holding member for holding at least an optical fiber, and which is to be coupled to a connecting member, such as an optical adapter or an optical receptacle, opposing the optical connector, the optical connector comprising: first and second movable members held on the optical connector body to be axially movable in a longitudinal direction; locking means for locking the first movable member and the second movable member when the first movable member is located at a predetermined locking position in a tip part of the optical connector body, and integrally moving the first movable member and the second movable member; and unlocking means formed in the optical connector body, and including a locking acting portion which acts on the locking means when the first movable member is located rearwardly of a predetermined unlocking position in a rear part of the optical connector body, to unlock the first movable member and the second movable member, and which locks the first movable member and the second movable member when the first movable member is located forwardly of the unlocking position, and a second movable member hooking portion for inhibiting rearward movement of the second movable member after the first movable member and the second movable member are unlocked, and wherein the second movable member has a functional portion having a predetermined function, and when the second movable member is located at a predetermined position in the optical connector body, the function acts on the holding member or the optical fiber to fulfill the function.

The present invention is also applied to an optical connector having a knob surrounding an optical connector body, such as an F04-type optical connector.

Examples of the second movable member are a plate-shaped member comprising a light blocking material having the function of blocking light from the end surface of the optical fiber; one which has a cleaning member stuck to the inside of the tip part of the plate-shaped member, thus having the function of cleaning the end surface of the optical fiber; one having the filter function of allowing passage of light of a specific wavelength exiting from the end surface of the optical fiber; and one having the protective function of protecting the neighborhood of the end portion of the optical fiber.

According to the optical connector concerned with this aspect of the invention, it becomes possible to locate the second movable member at a predetermined position with respect to the optical fiber by an operation for coupling the optical connector to the connecting member, or withdrawing the optical connector from the connecting member. By so doing, if a light blocking function or a cleaning function is imparted to the functional portion of the second movable member, the operation for coupling to the connecting member makes it possible to automatically clean the end surface of the optical fiber, then displace the light blocking member from the connecting optical path of the optical fiber, and achieve the connection of the optical fiber. The operation for withdrawing the optical connector from the connecting member can automatically clean the end surface of the optical fiber, and then cover the end surface of the optical fiber to realize light blocking and protection from dust.

An optical connector according to a second aspect of the invention, for solving the above problems, is the optical connector according to the first aspect, characterized in that the first movable member has a contact portion to be brought into contact with the connecting member, and the first movable member is of a structure such that the first movable member is moved with respect to the optical connector body when the optical connector body is coupled to the connecting member, and that a positional relationship between the contact portion and the connecting member is maintained until coupling between the optical connector body and the connecting member is released.

An optical connector according to a third aspect of the invention, for solving the above problems, is the optical connector according to the first or second aspect, characterized in that the locking means has a locking part provided in the first movable member, and a locked part which is to be locked to the locking part and is provided in the second movable member, the locking acting portion is composed of a first unlocking ride-on portion provided in the first movable member, and a second unlocking ride-on portion provided in the optical connector body, and the first unlocking ride-on portion and the second unlocking ride-on portion are disposed such that when the first unlocking ride-on portion rides on the second unlocking ride-on portion, locking between the locking part and the locked part is released, when the first movable member is located at the predetermined locking position, the first unlocking ride-on portion does not ride on the second unlocking ride-on portion, and when the first movable member is located at the unlocking position, the first unlocking ride-on portion rides on the second unlocking ride-on portion.

An optical connector according to a fourth aspect of the invention, for solving the above problems, is the optical connector according to the third aspect, characterized in that the second movable member has a tip part where the functional portion is formed, and a basal portion provided with the locked part and an abutment surface, the second movable member hooking portion is composed of an abutment surface provided in a front part of an unlocking portion of the optical connector body, and a groove which is provided in the optical connector body and which the basal portion of the second movable member can go into and go out of, and when the second movable member is located at the unlocking position, the abutment surface of the second movable member abuts on the abutment surface of the second unlocking ride-on portion and, simultaneously, the basal portion of the second movable member goes into the groove, whereby the second movable member is inhibited from moving rearwardly of the unlocking position.

An optical connector according to a fifth aspect of the invention, for solving the above problems, is the optical connector according to the third or fourth aspect, characterized in that the first unlocking ride-on portion of the first movable member is a protrusion-shaped unlocking ride-on portion, the second unlocking ride-on portion of the optical connector body is a protrusion-shaped ride-on portion provided in the optical connector body, the unlocking ride-on portion rides on the protrusion-shaped ride-on portion, whereby the locking part is lifted in an interlocked manner and dislodged from the locked part for release of locking, and the unlocking ride-on portion and the protrusion-shaped ride-on portion are disposed such that when the first movable member is located at the unlocking position, locking between the locking part and the locked part is released.

An optical connector according to a sixth aspect of the invention, for solving the above problems, is the optical connector according to any one of the third to fifth aspects, characterized in that the basal portion has a locking rear end part, and is structured such that rearwardly of the locking rear end part, the locking protrusion and the second movable member do not interfere with each other, a flat part is provided in one of or both of the unlocking ride-on portion and the protrusion-shaped ride-on portion, between a position where the first movable member is located at the unlocking position and a position where the locking protrusion is located rearwardly of the locking rear end part, the unlocking ride-on portion and the protrusion-shaped ride-on portion abut on each other at the flat part to maintain a state in which the unlocking ride-on portion rides on the protrusion-shaped ride-on portion, and to maintain a state in which locking between the first movable member and the second movable member is released.

An optical connector according to a seventh aspect of the invention, for solving the above problems, is the optical connector according to any one of the first to sixth aspects, characterized in that an elastic body is disposed between the optical connector body and the first movable member.

An optical connector according to an eighth aspect of the invention, for solving the above problems, is the optical connector according to any one of the first to seventh aspects, characterized in that the second movable member has a plate-shaped tongue piece which is a plate-shaped metal being a light blocking material and curved at a leading end of the plate-shaped metal, and which has a cleaning member stuck to an inside of the leading end thereof as the functional portion, the functional portion of the second movable member having a light blocking function and a dustproof function.

EFFECTS OF THE INVENTION

According to the optical connector concerned with the present invention, when the optical connector is withdrawn from the connecting member and the first movable member is moved to the tip part of the optical connector, the second movable member is also moved accordingly to cover the end surface of the optical fiber with the tip part of the second movable member. When the optical connector is connected to the connecting member for coupling, on the other hand, the first movable member is moved rearwardly with respect to the optical connector body and the optical connector body protrudes. The second movable member is also moved rearwardly with respect to the optical connector body, and the end surface of the optical fiber is exposed. Thus, the optical connector body can be connected as such to the connecting member. Consequently, the operation for connecting the optical connector to the connecting member becomes easy, simplifying the operation itself. By using, as the second movable member, the plate-shaped tongue piece comprising the light blocking material having the function of blocking light from the end surface of the optical fiber, the one having the filter function of allowing passage of light of a specific wavelength exiting from the end surface of the optical fiber, and the one having the protective function of protecting the neighborhood of the end portion of the optical fiber, it becomes unnecessary to mount the optical connector with other member having the above functions. The cleaning member is stuck to the inside of the tip part of the plate-shaped member, and the cleaning member is moved in close contact with the end surface of the optical fiber, whereby the function of cleaning the end surface of the optical fiber is imparted. By so doing, when the optical connector is connected to the connecting member, the end surface of the optical fiber is cleaned. This obviates the need for cleaning the end surface of the optical fiber by the operator. As a result, handleability is improved.

BRIEF DESCRIPTION OF THE DRAWINGS

FIGS. 5A, 5B are views showing a state in which the optical connector according to the first embodiment of the present invention is connected to a connecting member.

FIG. 6A, 6B are views showing a state in which the optical connector according to the first embodiment of the present invention is withdrawn from the connecting member.

FIG. 10 is an enlarged view of an essential part of the optical connector according to the first embodiment of the present invention.

DESCRIPTION OF THE NUMERALS AND SYMBOLS

1 optical fiber, 2, 49 ferrule, 3, 44 helical spring, 4 plug frame, 5 knob, 6, 41 optical connector body, 7, 42 first movable member, 8, 43 second movable member, 9, 46 cleaning member, 10 protrusion-shaped ride-on portion, 11, 12 unlocking ride-on portion, 13, 45 groove, 20, 40 optical connector, 30 connecting member.

BEST MODE FOR CARRYING OUT THE INVENTION

The best mode for putting the optical connector according to the present invention into practice will be described concretely based on the following embodiments.

Embodiment 1

An optical connector according to a first embodiment of the present invention will be described with reference to the accompanying drawings. In these drawings, details are omitted.

Figure 1:
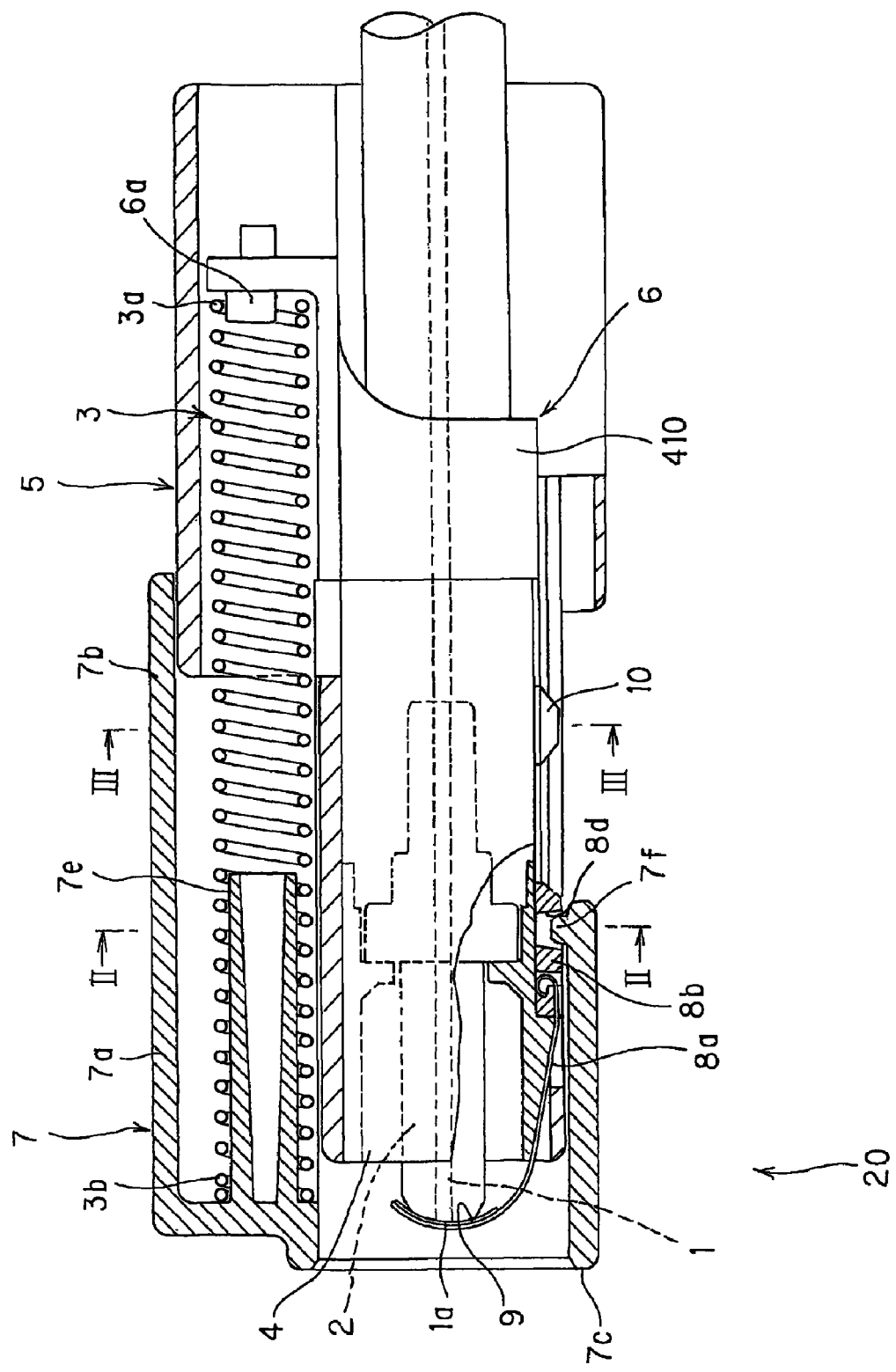
FIG. 1 is a sectional view of an optical connector according to a first embodiment of the present invention.
Figure 2:
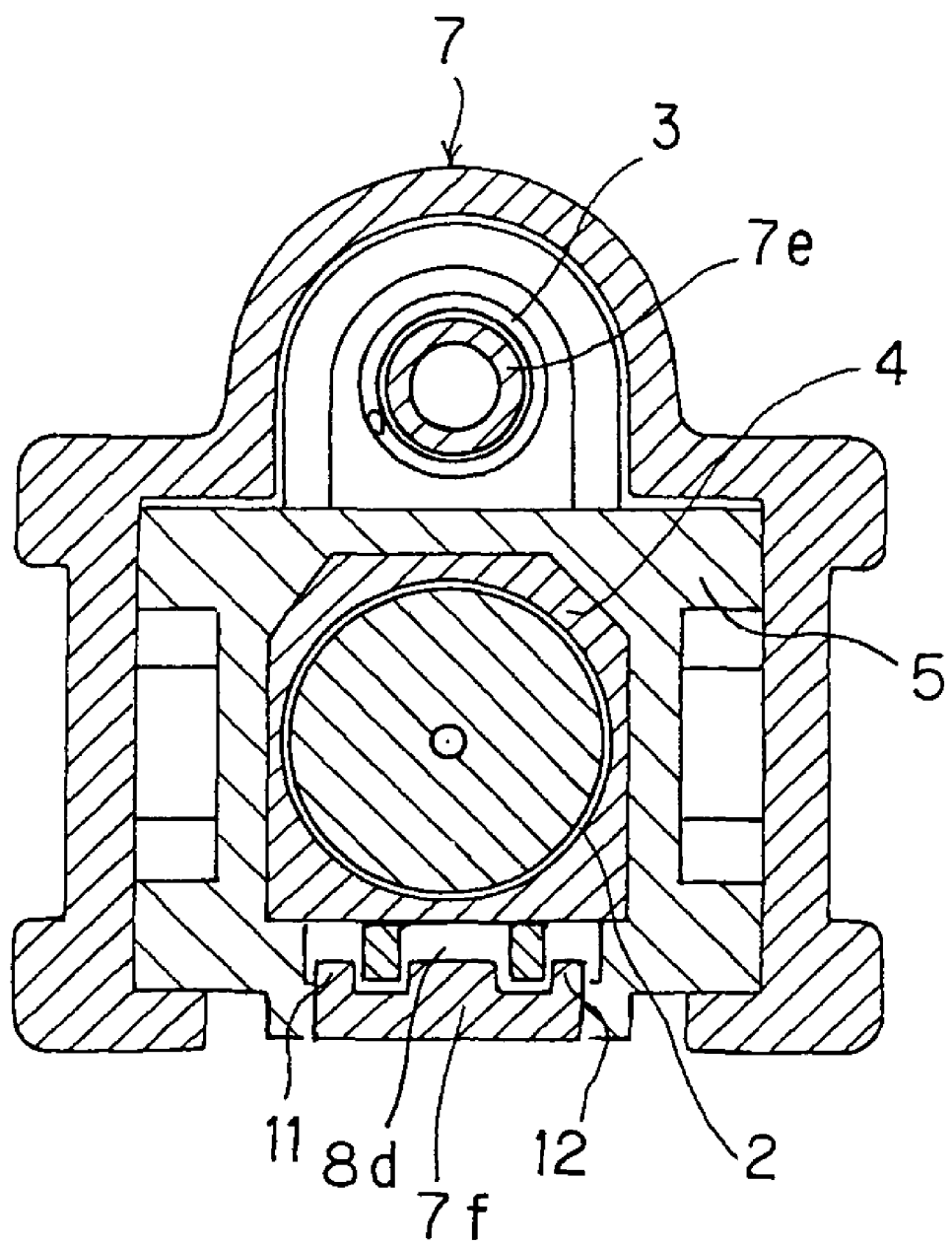
FIG. 2 is a sectional view taken along line II-II in FIG. 1.
Figure 3:
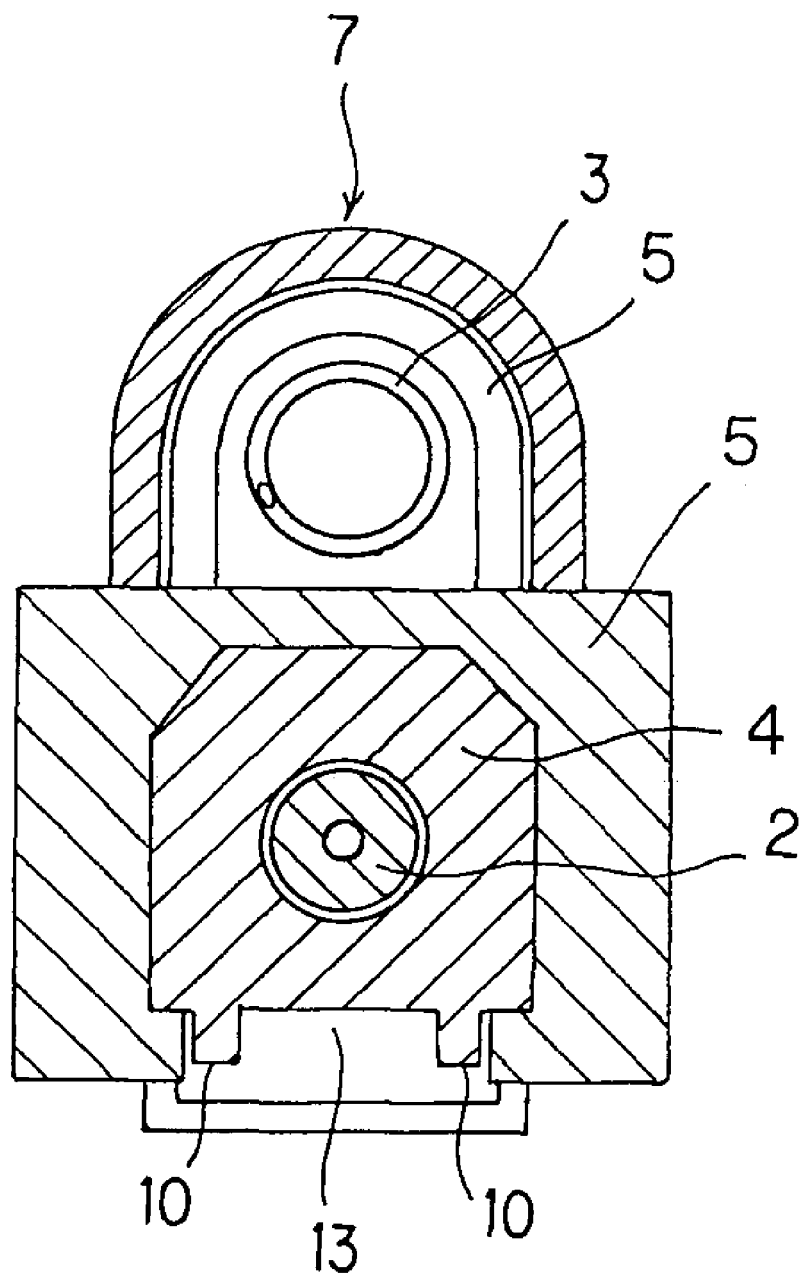
FIG. 3 is a sectional view taken along line III-III in FIG. 1.
Figure 4:
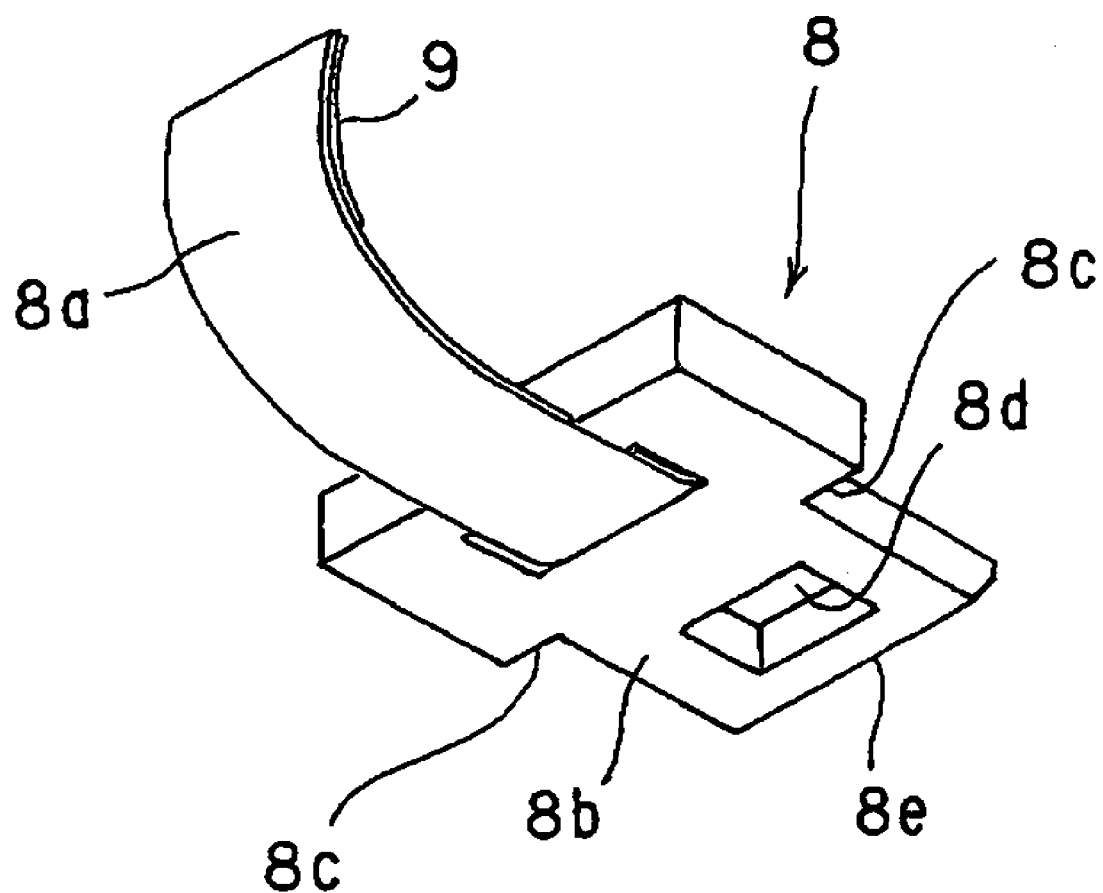
FIG. 4 is a perspective view showing an example of a second movable member used in the optical connector according to the first embodiment of the present invention.
Figure 7A:
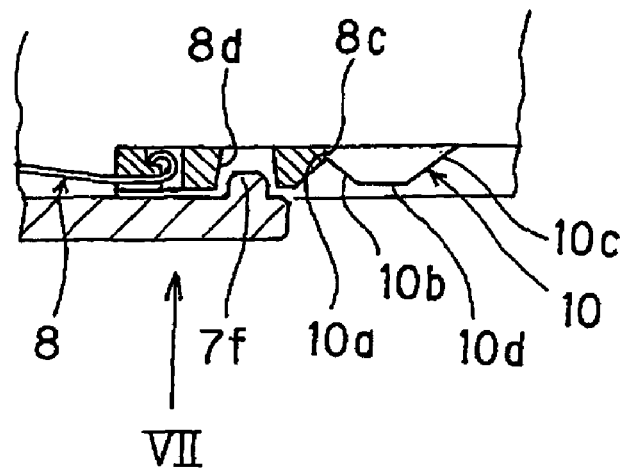
FIGS. 7A, 7B are views showing a state in which the second movable member used in the optical connector according to the first embodiment of the present invention is located at an unlocking position.
Figure 7B:
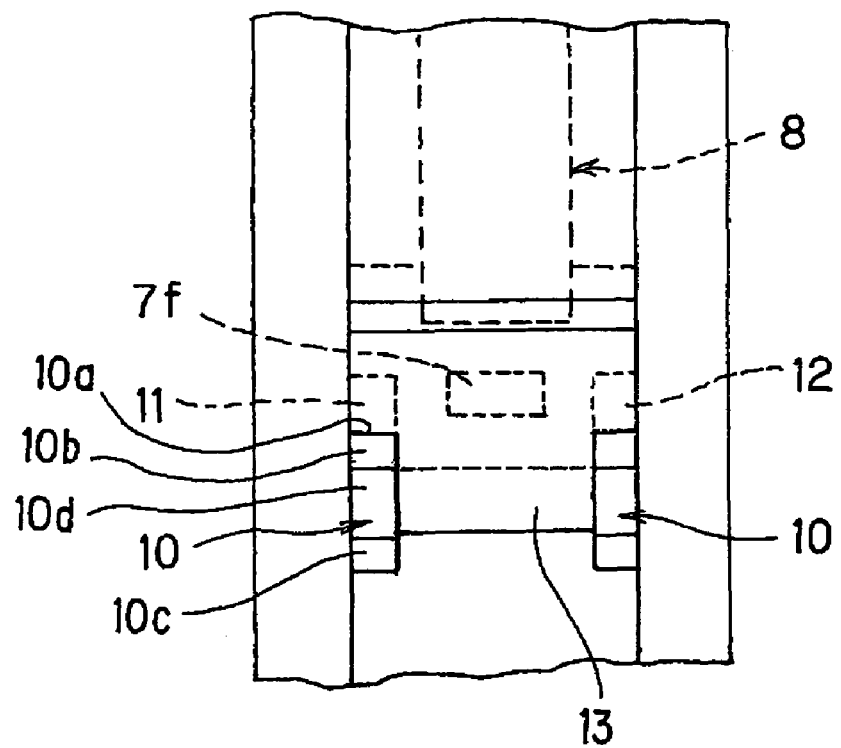
Figure 8A:
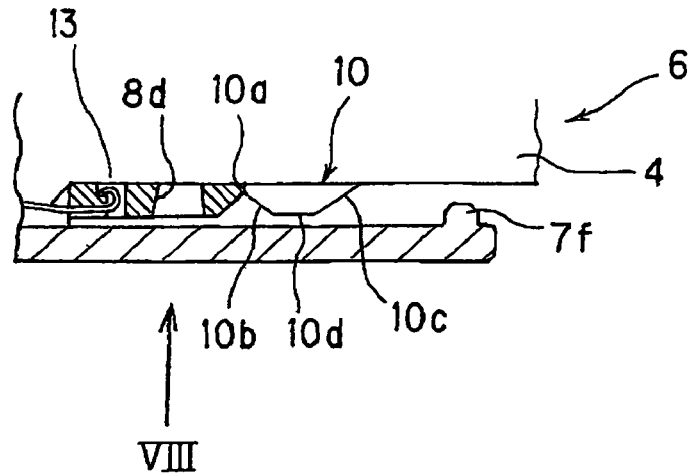
FIGS. 8A, 8B are views showing a state in which the second movable member used in the optical connector according to the first embodiment of the present invention is located rearwardly of the unlocking position.
Figure 8B:
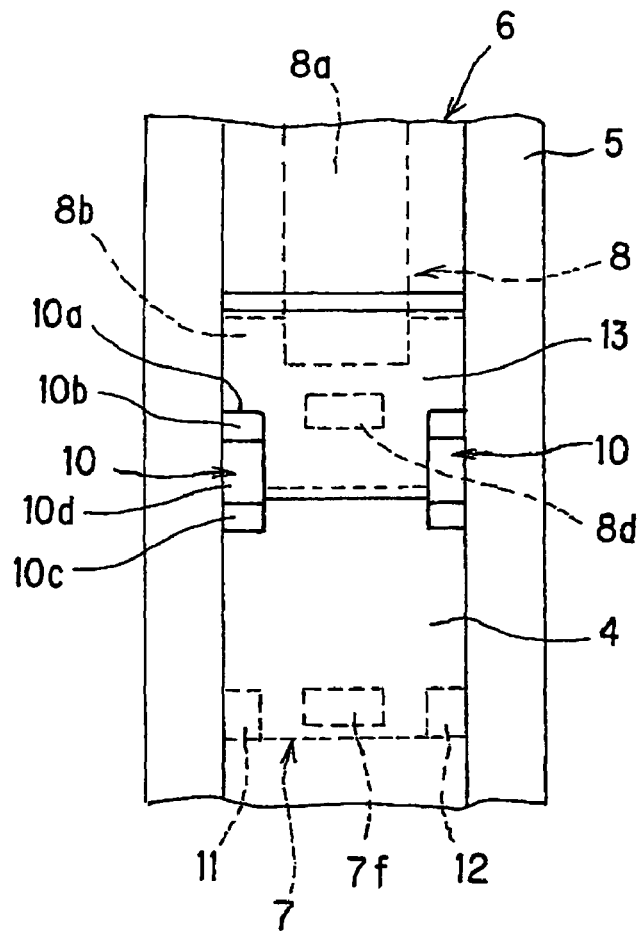
Figure 9:
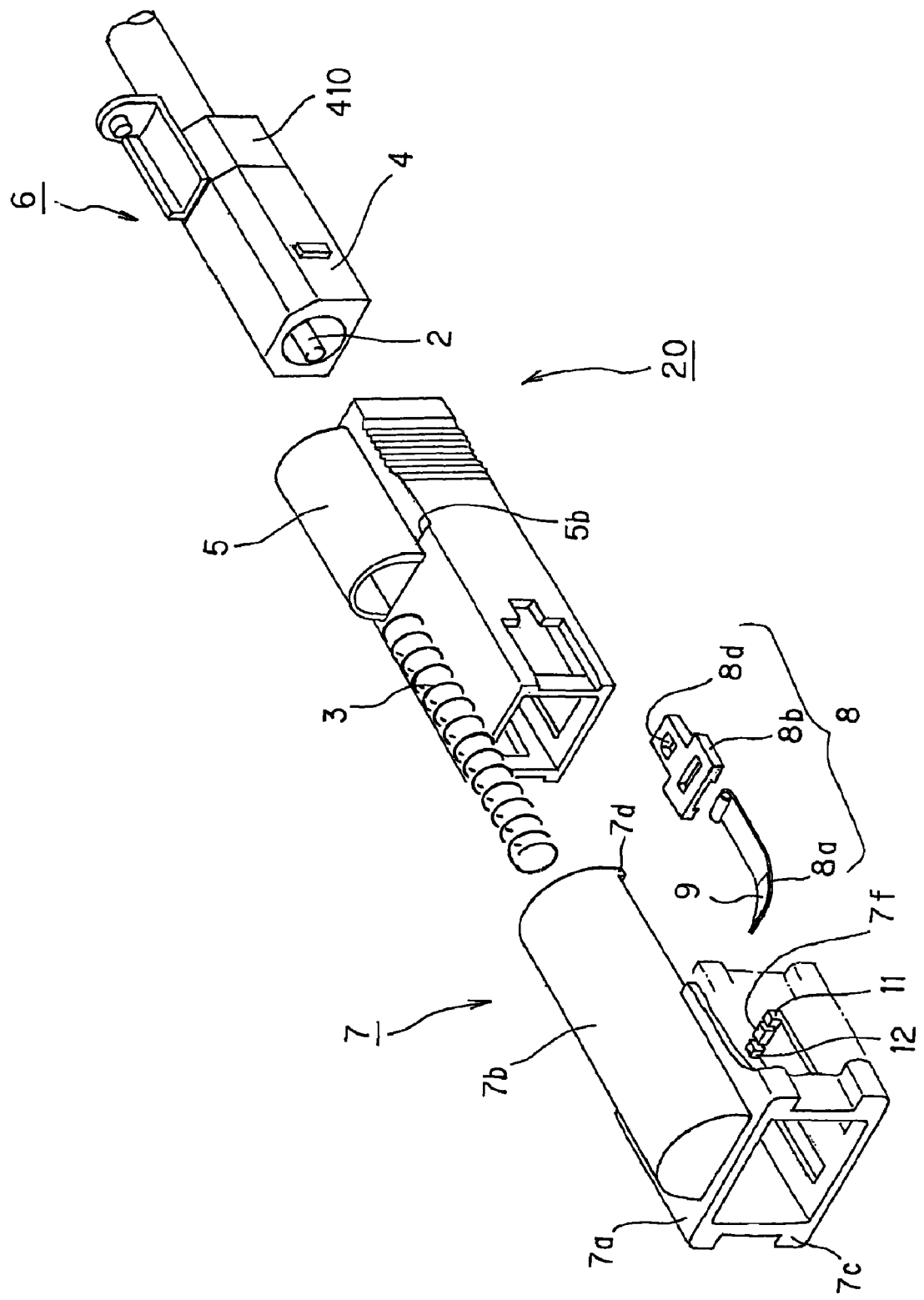
FIG. 9 is an exploded view of the optical connector according to the first embodiment of the present invention.

FIG. 1 is a sectional view of the optical connector according to the first embodiment of the present invention. FIG. 2 is a sectional view taken along line II-II in FIG. 1. FIG. 3 is a sectional view taken along line III-III in FIG. 1. FIG. 4 is a perspective view showing an example of a second movable member used in the optical connector according to the first embodiment of the present invention. FIGS. 5A, 5B are views showing a state in which the optical connector according to the first embodiment of the present invention is connected to a connecting member, FIG. 5A showing the front of the connected optical connector, and FIG. 5B showing the side of the connected optical connector. FIGS. 6A, 6B are views showing a state in which the optical connector according to the first embodiment of the present invention is withdrawn from the connecting member, FIG. 6A showing the front of the detached optical connector, and FIG. 6B showing the side of the detached optical connector. FIGS. 7A, 7B are views showing a state in which the second movable member used in the optical connector according to the first embodiment of the present invention is located at an unlocking position, FIG. 7A being a side sectional view of the second movable member in this state, and FIG. 7B being a view taken along an arrowed line VII in FIG. 7A. FIGS. 8A, 8B are views showing a state in which the second movable member used in the optical connector according to the first embodiment of the present invention is located rearwardly of the unlocking position, FIG. 8A being a side sectional view of the second movable member in this state, and FIG. 8B being a view taken along an arrowed line VIII in FIG. 8B. FIG. 9 is an exploded view of the optical connector according to the first embodiment of the present invention. FIG. 10 is an enlarged view of an essential part of the optical connector according to the first embodiment of the present invention.

The optical connector according to the first embodiment of the present invention is an optical connector having a coupling portion of an F04-type single fiber connector according to the JIS C5973 (see an illustration of a coupling portion of an optical connector in FIG. 1 under JIS C5973). As shown in FIG. 1, an optical connector 20 has an optical connector body 6 composed of a ferrule 2 as a holding member for holding at least an optical fiber 1, a plug frame 4 incorporating a spring (not shown) for urging the ferrule 2, and a stop ring 410 coupled to the plug frame 4; and has a knob 5, as shown in Attached View 1 of JIS C5973. The optical connector body 6 and the knob 5 are integrally coupled to a connecting member 30 (see FIG. 5) opposing them, such as an optical adapter or an optical receptacle. The optical connector 20 comprises a first movable member 7 (frame) and a second movable member 8 held on the optical connector body 6 to be axially movable in a longitudinal direction; a locking means for locking the first movable member 7 and the second movable member 8 when the first movable member 7 is located at a predetermined locking position in a tip part of the optical connector body 6, and integrally moving the first movable member 7 and the second movable member 8; and an unlocking means provided in the optical connector body 6, and including a locking acting portion which acts on the locking means when the first movable member 7 is located rearwardly of a predetermined unlocking position in a rear part of the optical connector body, to unlock the first movable member 7 and the second movable member 8, and which locks the first movable member 7 and the second movable member 8 when the first movable member 7 is located forwardly of the unlocking position, and a second movable member hooking portion for inhibiting rearward movement of the second movable member 8 after the first movable member 7 and the second movable member 8 are unlocked. An upward protrusion 5b, which is locked by a downward protrusion 7d (to be described later) of the first movable member 7 and protrudes upward, is formed in the knob 5.

A helical spring 3, which is an elastic body, is disposed between the optical connector body 6 and the first movable member 7. One end 3a of the helical spring 3 is locked to a locking protrusion 6a formed in the optical connector body 6, and the other end 3b of the helical spring 3 is locked to a tubular protrusion 7e formed in the first movable member 7. By disposing the helical spring 3 at such a position, the first movable member 7 can be moved from a rear part to a front part of the optical connector body 6 by utilization of the expanding and contracting force (restoring force) of the helical spring 3. As a result, when the optical connector 20 is pulled out of the connecting member 30, an operator does not need any more to perform an operation for moving the first movable member 7. Thus, handleability is improved.

The first movable member 7 has a roughly square-shaped tubular tip part 7a, and a protective portion 7b extending rearwardly from the tip part 7a, as shown in FIGS. 1, 2, 3, 6A and 6B, and 9. The downward protrusion 7d, which is locked by the upward protrusion 5b of the knob 5 and protrudes downward, is formed in a lower rear part of the protective portion 7b. By forming the upward protrusion 5b and the downward protrusion 7d, the downward protrusion 7d is locked by the upward protrusion 5b, even when the expanding and contracting force of the helical spring 3 acts on the first movable member 7 to move the first movable member 7 forwardly with respect to the knob 5. Thus, the disengagement of the first movable member 7 from the knob 5 is prevented. A contact portion 7c is formed at the leading end surface of the tip part 7a of the first movable member 7. The contact portion 7c is of nearly the same shape as that of the leading end of the connecting member 30 to be coupled to the optical connector 20. In the process of the optical connector 20 being coupled to the connecting member 30, the leading end surface of the first movable member 7 (i.e., the contact portion 7c) abuts on the leading end surface of the connecting member 30. While the optical connector 20 is being coupled to the connecting member 30, the leading end surface 7c of the first movable member 7 and the leading end surface of the connecting member 30 are in contact with each other. This positional relationship is maintained until the optical connector 20 is withdrawn from the connecting member 30 to release the coupling between the connecting member 30 and the optical connector 20.

Thus, when the optical connector 20 is to be coupled to the connecting member 30, the optical connector body 6 is inserted, integrally with the knob 5, into the connecting member 30. At this time, the first movable member 7 is moved with respect to the optical connector body 6, with the positional relationship between the first movable member 7 and the connecting member 30 being maintained.

The second movable member 8 is equipped with a functional portion having a predetermined function. When the second movable member 8 is located at a predetermined position in the optical connector body 6, this function acts on the ferrule 2 or the optical fiber 1 to exhibit this function.

As shown in FIG. 1 and FIG. 4, the second movable member 8 includes a plate-shaped tongue piece 8a which is a plate-shaped metal being a light blocking material and curved at a leading end of the plate-shaped metal, and which has a cleaning member 9 (cleaning cloth) stuck to an inside of the leading end thereof as the functional portion; and a basal portion 8b which is fixed to a rear part of the plate-shaped tongue piece 8a, which has a locked part engaging a locking protrusion 7f (to be described later) as a locking part of the first movable member 7, and which has an abutment surface 8c. The basal portion 8b has a locked part rear end 8e, and is structured such that the locking protrusion 7f and the second movable member 8 do not interfere with each other at a site behind the locked part rear end 8e. In the basal portion 8b, a locking hole 8d as the locked part is formed.

The functional portion of the second movable member 8 has a light blocking function and a dustproof function. That is, when the plate-shaped tongue piece 8a, which is a tip part of the second movable member 8, is located at the leading end of the optical connector body 6, an end surface 1a of the optical fiber 1 is covered with the plate-shaped tongue piece 8a, whereby emission of light from the end surface 1a of the optical fiber 1 to the outside is prevented for light blocking. Accordingly, even when the optical connector 20 is pulled out of the connecting member 30, the end surface 1a of the optical fiber 1 is covered with the plate-shaped tongue piece 8a which is the functional portion of the second movable member 8. In this manner, the handleability of the optical connector 20 is improved. Moreover, the cleaning member 9 moves in close contact with the end surface 1a of the optical fiber 1, thereby preventing adhesion of dust or the like to the end surface 1a of the optical fiber 1 to ensure dustproof properties. Thus, a decrease in the transmission loss of light can be curtailed. As noted here, the functional portion of the second movable member 8 has a structure which acts on the optical fiber 1 and the ferrule 2 to exhibit a light blocking function and a dustproof function.

Examples of the second movable member 8 are not only the above-mentioned one which has the cleaning member 9 stuck to the inside of the tip part of the plate-shaped tongue piece 8a, thus having a light blocking function and a dustproof function; but also one having the filter function of allowing passage of light of a specific wavelength exiting from the end surface of the optical fiber, and one having the protective function of protecting the neighborhood of the end portion of the optical fiber. If the functional portion of the second movable member 8 has the filter function, the tip part of the second movable member 8 is disposed at the end surface of the optical fiber when the optical connector is not coupled to the connecting member, to fulfill the function of allowing exit of only light having a specific wavelength. Generally, the frequency of light for communications is a wavelength invisible to the human eye. If light of a wavelength visible to the human eye is superposed on a signal for communications, and the property of being pervious to only light having the superposed wavelength is imparted to the filter, the present invention makes it possible to recognized visually whether light is passed or not, even if the optical connector is detached from the connecting member.

The locking means has the locking protrusion 7f of a protruding shape which is the locking part provided in the first movable member 7, and the locking hole 8d which is the locked part locked by the locking protrusion 7f and provided in the second movable member 8. When the first movable member 7 is located at the predetermined locking position of the tip part of the optical connector 20, the locking protrusion 7f and the locking hole 8d are locked together, as shown in FIGS. 7A and 7B. As a result, the first movable member 7 and the second movable member 8 are locked together, so that the first movable member 7 and the second movable member 8 are integrally moved. By adopting such a structure, the structure itself is so simple that an increase in the manufacturing cost can be curtailed. Locking between the locking protrusion 7f and the locking hole 8d can be released by the unlocking means to be described later.

As shown in FIGS. 7A, 7B and 8A, 8B, a protrusion-shaped ride-on portion 10 (a second unlocking ride-on portion of the optical connector body 6) is provided at a nearly middle site, in the longitudinal direction, of a lower part of the optical connector body 6, and has an abutment surface 10a located forward and extending in the vertical direction, acting parts 10b and 10c formed forward and rearward and comprising inclined surfaces, and a flat part 10d communicating with the acting parts 10b, 10c and comprising a flat surface.

The locking acting portion is composed of protrusion-shaped unlocking ride-on portions 11, 12 which are first unlocking ride-on portions provided on both sides of a lower inner side of the first movable member 7, and the above-mentioned protrusion-shaped ride-on portion 10, as shown in FIGS. 2, 7A, 7B, 8A, 8B, and 9. The unlocking ride-on portion 11 has acting parts 11a, 11b comprising inclined surfaces formed forward and rearward, and a flat part 11c communicating with the acting parts 11a, 11b and comprising a flat surface. The unlocking ride-on portion 12 also has a shape similar to that of the unlocking ride-on portion 11. When the first movable member 7 is located at the aforementioned predetermined locking position, the unlocking ride-on portions 11, 12 do not ride on the protrusion-shaped ride-on portion 10, so that the locking between the first movable member 7 and the second movable member 8 is not released. That is, the locking state of the first movable member 7 and the second movable member 8 is maintained. When the first movable member 7 is located at the aforementioned unlocking position, the unlocking ride-on portions 11, 12 ride on the protrusion-shaped ride-on portion 10. As a result, the locking protrusion 7f escapes from the locking hole 8d, so that the locking between the locking protrusion 7f and the locking hole 8d is released, with the result that the first movable member 7 and the second movable member 8 are unlocked.

The second movable member hooking portion is composed of the abutment surface 10a of the protrusion-shaped ride-on portion 10 provided ahead of the unlocking portion of the optical connector body 6, and a groove 13 which is provided between the unlocking ride-on portions 11 and 12 in the optical connector body 6, and which the basal portion 8b of the second movable member 8 can go into and go out of. When the second movable member 8 is disposed at the unlocking position, the abutment surface 8c of the second movable member 8 and the abutment surface 10a of the protrusion-shaped ride-on portion 10 abut on each other. At the same time, the rear part of the basal portion 8b of the second movable member 8 enters the groove 13, thereby inhibiting the second movable member 8 from moving rearwardly of the unlocking position.

When the first movable member 7 is disposed rearwardly of the above-mentioned unlocking position, namely, when the locking protrusion 7f is located rearwardly of the rear end of the locking part, the unlocking ride-on portions 11, 12 and the protrusion-shaped ride-on portion 10 abut on each other at the flat parts 10d, 11c. Thus, the state of the unlocking ride-on portions 11, 12 riding on the protrusion-shaped ride-on portion 10 is maintained, and the state of unlocking between the first movable member 7 and the second movable member 8 is maintained. When the first movable member 7 is disposed further rearwardly, the unlocking ride-on portions 11, 12 of the first movable member 7 are located rearwardly of the protrusion-shaped ride-on portion 10, so that the ride-on state is released Thus, the plastic deformation of the unlocking ride-on portions 11, 12 of the first movable member 7 is suppressed.

The unlocking ride-on portions 11, 12 are disposed such that when the first movable member 7 is at the unlocking position, locking between the locking protrusion 7f of the first movable member 7 and the locking hole 8d of the second movable member is released, and the unlocking ride-on portions 11, 12 of the first movable member 7 do not ride on the protrusion-shaped ride-on portion 10.

According to the optical connector concerned with the first embodiment of the present invention, therefore, when the optical connector 20 is withdrawn from the connecting member 30 and the first movable member 7 is moved to the tip part of the optical connector 20, the second movable member 8 is also moved accordingly to cover the end surface 1a of the optical fiber 1 with the plate-shaped tongue piece 8a of the second movable member 8. When the optical connector 20 is connected to the connecting member 30 for coupling, the first movable member 7 is moved rearwardly with respect to the optical connector body 6 and the optical connector body 6 protrudes. The second movable member 8 is also moved rearwardly with respect to the optical connector body 6, and the end surface 1a of the optical fiber 1 is exposed. Thus, the optical connector can be connected as such to the connecting member 30. Consequently, the operation for connecting the optical connector to the connecting member 30 becomes easy, simplifying the operation itself.

By using, as the second movable member 8, the plate-shaped tongue piece having the function of blocking light from the end surface 1a of the optical fiber 1, the one having the filter function of allowing passage of light of a specific wavelength exiting from the end surface 1a of the optical fiber 1, and the one having the protective function of protecting the neighborhood of the end portion of the optical fiber 1, it becomes unnecessary to mount the optical connector 20 with other member having the above functions. The cleaning member 9 is stuck to the inside of the tip part of the plate-shaped tongue piece 8a, and the cleaning member 9 is moved in close contact with the end surface 1a of the optical fiber 1, whereby the function of cleaning the end surface 1a of the optical fiber 1 is imparted. By so doing, when the optical connector 20 is connected to the connecting member 30, the end surface 1a of the optical fiber 1 is cleaned. This obviates the need for cleaning of the end surface 1a of the optical fiber 1 by the operator. As a result, handleability is improved.

When the optical connector 20 is connected to the connecting member 30, the contact portion 7c of the first movable member 7 contacts the front surface of the connecting member 30, whereby the first movable member 7 is moved rearward, and the optical connector body 6 protrudes from the first movable member 7. Thus, the optical connector body 6 can be connected, unchanged, to the connecting member 30. As a result, the operation for connecting the optical connector to the connecting member 30 becomes easy, simplifying the operation itself.

Moreover, locking and unlocking of the first movable member 7 and the second movable member 8 can be performed reliably. The movement of the second movable member 8 which is rearward of the unlocking position can be made more reliably. The second movable member 8 itself is simple in structure, thus curtailing an increase in its manufacturing cost. The position of locking between the first movable member 7 and the second movable member 8, and their unlocking position can be easily set. The plastic deformation of the unlocking ride-on portions 11, 12 of the first movable member 7 can be suppressed. Even when the first movable member 7 is moved further rearwardly of the unlocking position, the second movable member 7 still remains at the unlocking position (groove portion). Thus, there is the advantage that the functional member is not moved unnecessarily.

By utilizing the expanding and contracting force (restoring force) of the helical spring 3, the first movable member 7 can be moved from the rear part to the front part of the optical connector body 6. As a result, when the optical connector 20 is pulled out of the connecting member 30, the operator need not perform an operation for moving the first movable member 7. Thus, handleability is improved.

By providing the unlocking means, the cleaning member 9, when stuck to the inside of the tip part of the plate-shaped tongue piece 8a, moves minimally. As a result, the range of contact of the cleaning member 9 with the optical connector body 6 becomes narrow. Thus, the deterioration of the cleaning member 9 can be suppressed.

In the above descriptions, the unlocking ride-on portions 11, 12 and the protrusion-shaped ride-on portion 10 are each illustrated as having the flat part formed therein. However, either the unlocking ride-on portions 11, 12 or the protrusion-shaped ride-on portion 10 may have the flat part formed therein. Such configurations exhibit the same actions and effects as those described above.

In the foregoing descriptions, the second movable member 8 is illustrated as having the locking hole 8d as the locked part. However, it suffices for the locked part to have a shape which can be locked to the locking protrusion 7f. The second movable member 8 having a groove which can be locked to the locking protrusion 7f shows the same actions and effects as those stated above.

Embodiment 2

An optical connector according to a second embodiment of the present invention will be described concretely with reference to the accompanying drawings. The optical connector according to the second embodiment has the same structure as that of the optical connector according to the first embodiment, except that the unlocking means is changed.

Figure 11A:
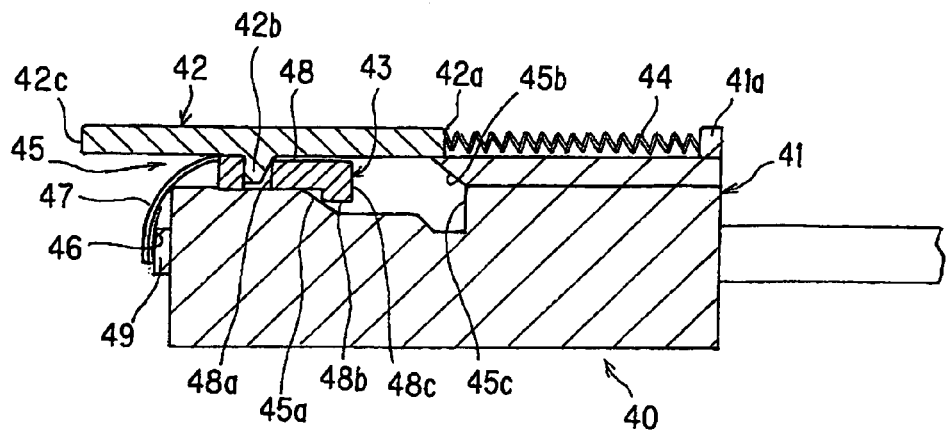
FIGS. 11A to 11C are explanation drawings of an optical connector according to a second embodiment of the present invention.
Figure 11B:
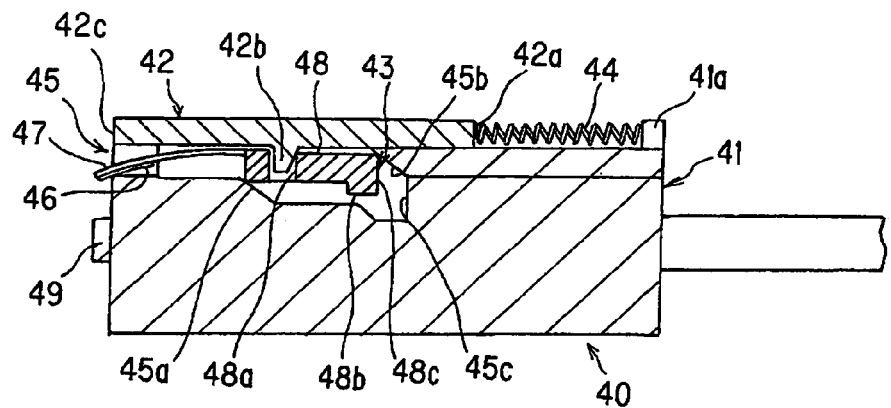
Figure 11C:
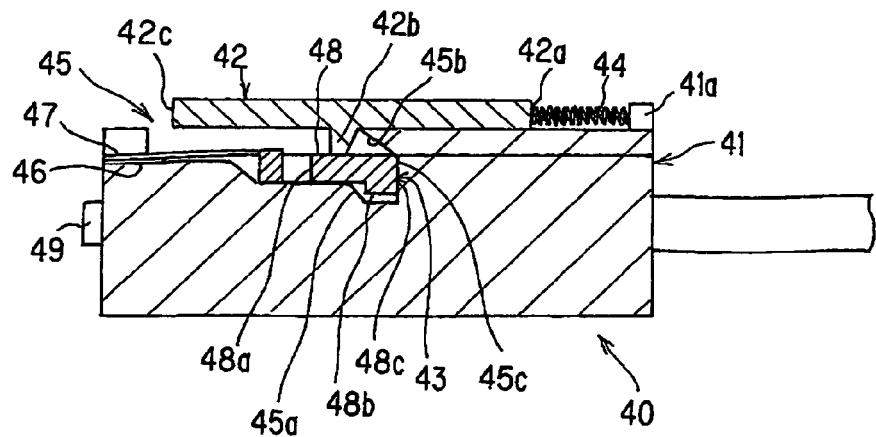

FIGS. 11A to 11C are explanation drawings of the optical connector according to the second embodiment of the present invention. FIG. 11A shows a state in which the first movable member and the second movable member possessed by the optical connector are locked. FIG. 11B shows a state in which the first movable member possessed by the optical connector is located at the unlocking position. FIG. 11C shows a state in which the first movable member and the second movable member possessed by the optical connector are unlocked.

The optical connector according to the second embodiment of the present invention is an optical connector which has an optical connector body incorporating a ferrule as a holding member for holding at least an optical fiber, and which is coupled to a connecting member opposing the optical connector. An optical connector 40, as shown in FIGS. 11A to 11C, comprises a first movable member 42 and a second movable member 43 held on an optical connector body 41 to be axially movable in a longitudinal direction; a locking means for locking the first movable member 42 and the second movable member 43 when the first movable member 42 is located at a predetermined locking position at a tip part of the optical connector body, and integrally moving the first movable member 42 and the second movable member 43; and an unlocking means including a locking acting portion which is provided in the optical connector body 41, which acts on the locking means when the first movable member 42 is located rearwardly of a predetermined unlocking position in a rear part of the optical connector body, to unlock the first movable member 42 and the second movable member 43, and which locks the first movable member 42 and the second movable member 43 when the first movable member 42 is located forwardly of the unlocking position, and a second movable member hooking portion which is provided in the optical connector body 41 for inhibiting rearward movement of the second movable member 43 after the first movable member 42 and the second movable member 43 are unlocked.

A helical spring 44, which is an elastic body, is disposed between the optical connector body 41 and the first movable member 42. One end of the helical spring 44 is connected to a rear end 42a of the first movable member 42, and the other end of the helical spring 44 is connected to a protrusion 41a provided in an upper rear part of the optical connector body 41. By disposing the helical spring 44 at such a position, the first movable member 42 can be moved from a rear part to a front part of the optical connector body 41 by utilization of the expanding and contracting force (restoring force) of the helical spring 44. As a result, when the optical connector 40 is pulled out of a connecting member, an operator does not need any more to perform an operation for moving the first movable member 42. Thus, handleability is improved.

The first movable member 42 is plate-shaped, and has a projection-shaped locking protrusion 42b (locking portion) formed nearly in the middle, in the longitudinal direction, of a lower surface of the first movable member 42, and a contact portion 42c formed at a leading end surface of the first movable member 42. In the process of the optical connector 41 being coupled to the connecting member, the contact portion 42c abuts on the leading end surface of the connecting member. While the optical connector is being coupled to the connecting member, the leading end surface of the first movable member 42 and the leading end surface of the connecting member are in contact with each other. This positional relationship is maintained until the optical connector 40 is withdrawn from the connecting member to release the coupling between the connecting member and the optical connector 40.

Thus, when the optical connector 40 is to be coupled to the connecting member, the optical connector body 41 is inserted into the connecting member. However, the first movable member 42 is moved with respect to the optical connector body 41, with the positional relationship between the first movable member 42 and the connecting member being maintained.

The second movable member 43 is furnished with a functional portion having a predetermined function. When the second movable member 43 is located at a predetermined position in the optical connector body 41, this function acts on a ferrule 49 or the optical fiber to exhibit this function. That is, when a plate-shaped tongue piece 47, which is a tip part of the second movable member 43, is disposed at the leading end of the optical connector body 41, an end surface (not shown) of the optical fiber is covered with the plate-shaped tongue piece 47, whereby emission of light from the end surface of the optical fiber to the outside is prevented for light blocking. Accordingly, even when the optical connector is pulled out of the connecting member, the end surface of the optical fiber is covered with the second movable member 43. In this manner, the handleability of the optical connector 40 is improved. Moreover, a cleaning member 46 moves in close contact with the end surface of the optical fiber, thereby preventing adhesion of dust or the like to the end surface of the optical fiber to ensure a dustproof state. Thus, a decrease in the transmission loss of light can be curtailed. As noted here, the functional portion of the second movable member 43 has a structure which acts on the optical fiber and the ferrule 49 to exhibit a light blocking function and a dustproof function.

The second movable member 43 is furnished with a functional portion 46 having a function at the leading end thereof, and includes the plate-shaped tongue piece 47 comprising a metal plate cured at the leading end, and a basal portion 48 to which a rear part of the plate-shaped tongue piece is fixed. A locking hole 48a, which is a locked part locked to a locking protrusion of the first movable member to be described later, is formed in the basal portion 48. A downward protrusion 48b extending downwardly is formed in a rear part of the lower surface of the basal portion 48, and an abutment surface 48c is formed in a lower end part of the basal portion 48.

Examples of the second movable member 43 are not only the above-mentioned one which has the cleaning member 46 stuck to the inside of the tip part of the plate-shaped tongue piece 47, thus having a light blocking function and a dustproof function; but also one having the filter function of allowing passage of light of a specific wavelength exiting from the end surface of the optical fiber, and one having the protective function of protecting the neighborhood of the end part of the optical fiber.

The locking means has the locking protrusion 42b (locking portion) of a projecting shape which is provided in the first movable member 42, and the locking hole 48a of the second movable member 43. When the first movable member 42 is located at the predetermined locking position, the locking protrusion 42b and the locking hole 48a are locked together, and the first movable member 42 and the second movable member 43 are integrally moved. The locking means is unlocked by an unlocking means to be described later.

By the action of the locking means, when the first movable member 42 is located at the predetermined locking position at the leading end of the optical connector tip part, as shown in FIG. 11A, the second movable member 43 and the first movable member 42 are locked together. When the first movable member 42 is moved, the second movable member 43 is moved integrally with the first movable member 42, as shown in FIG. 11B, since the second movable member 43 is locked by the locking protrusion 42b of the first movable member 42. During this motion, the second movable member 43 is moved to a predetermined position. In accordance with this movement of the second movable member 43, the tip part of the plate-shaped tongue piece 47 provided with the functional portion is moved from a position where it covers the tip of the optical fiber, as shown in FIG. 11A, to a position where it exposes the tip of the optical fiber, as shown in FIG. 11C. Further, locking between the first movable member 42 and the second movable member 43 is released in this state. Even when the first movable member 42 is moved further rearward, therefore, the functional portion of the second movable member 43 is not moved.

A groove 45 extends axially in the longitudinal direction, and is formed to range from the leading end to nearly the middle of the optical connector body. The groove 45 has a first inclined surface 45a formed nearly in the middle of the groove 45 and extending axially longitudinally to be inclined toward the axis center, a second inclined surface 45b formed in the vicinity of the outer periphery of the rear end of the groove 45 and extending axially longitudinally to be inclined toward the axis center, and an abutment surface 45c (second movable member hooking portion) formed at the deepest rear end.

The locking acting portion has the first inclined surface 45a of the groove 45 which a lower part of the front end of the second movable member 43 contacts, and the second inclined surface 45b which an upper part of the rear end of the second movable member 43 contacts.

By the action of the unlocking means, when the first movable member 42 is located rearwardly of the predetermined unlocking position at the rear part of the optical connector body, locking between the first movable member 42 and the second movable member 43 is released, because the locking means is acted on, as shown in FIG. 11C. That is, when the first movable member 42 is located rearwardly of the unlocking position shown in FIG. 11B, a lower part of the front end and an upper part of the rear end of the basal portion 48 of the second movable member 43 are guided, respectively, by the first inclined surface 45a and the second inclined surface 45b of the optical connector body 41. Then, the downward protrusion 48c of the second movable member 43 enters the deepest part formed at the deepest site of the groove 45. Thus, locking between the first movable member 42 and the second movable member 43 is released. At this time, the locking protrusion 42b of the first movable member 42 abuts on the top of the basal portion 48 of the second movable member 43. Furthermore, the abutment surface 48c at the rear end of the basal portion 48 abuts against the second inclined surface 45b of the optical connector body 41. Consequently, after unlocking of the first movable member 42 and the second movable member 43, rearward movement of the second movable member 43 is inhibited.

According to the optical connector 40 concerned with the second embodiment of the present invention, therefore, the same actions and effects as those of the optical connector according to the first embodiment are exhibited. Besides, the second movable member 43 is moved along with the first movable member 42 because of the locking between the locking protrusion 42b and the locking hole 48a and thanks to the groove 45. Thus, in the process of the optical connector being connected to the connecting member, the end surface of the ferrule 49 is reliably exposed. Consequently, the ferrule 49 can be connected as such to the connecting member, thus improving the work efficiency.

INDUSTRIAL APPLICABILITY

The present invention can be utilized as an optical connector applied in connecting various optical instruments for optical fiber telecommunications, connecting optical fibers, and connecting an optical instrument and an optical fiber; and particularly, can be utilized as an optical connector having a structure which can be applied when it is necessary to provide the optical connector with a function other than connecting optical fibers.

The invention claimed is:

1. An optical connector which has an optical connector body incorporating a holding member for holding at least an optical fiber, and which is to be coupled to a connecting member, such as an optical adapter or an optical receptacle, opposing the optical connector, the optical connector comprising:
first and second movable members held on the optical connector body to be axially movable in a longitudinal direction;
locking means for locking the first movable member and the second movable member when the first movable member is located at a predetermined locking position in a tip part of the optical connector body, and integrally moving the first movable member and the second movable member; and unlocking means formed in the optical connector body, and including a locking acting portion which acts on the locking means when the first movable member is located rearwardly of a predetermined unlocking position in a rear part of the optical connector body, to unlock the first movable member and the second movable member, and which locks the first movable member and the second movable member when the first movable member is located forwardly of the unlocking position, and a second movable member hooking portion for inhibiting rearward movement of the second movable member after the first movable member and the second movable member are unlocked, wherein the second movable member has a functional portion having a predetermined function, and when the second movable member is located at a predetermined position in the optical connector body, the function acts on the holding member or the optical fiber to fulfill the function, the first movable member has a contact portion to be brought into contact with the connecting member, the first movable member is of a structure such that the first movable member is moved with respect to the optical connector body when the optical connector body is coupled to the connecting member, and that a positional relationship between the contact portion and the connecting member is maintained until coupling between the optical connector body and the connecting member is released, the locking means has a locking part provided in the first movable member, and a locked part which is to be locked to the locking part and is provided in the second movable member, the locking acting portion is composed of a first unlocking ride-on portion provided in the first movable member, and a second unlocking ride-on portion provided in the optical connector body, and the first unlocking ride-on portion and the second unlocking ride-on portion are disposed such that when the first unlocking ride-on portion rides on the second unlocking ride-on portion, locking between the locking part and the locked part is released, when the first movable member is located at the predetermined locking position, the first unlocking ride-on portion does not ride on the second unlocking ride-on portion, and when the first movable member is located at the unlocking position, the first unlocking ride-on portion rides on the second unlocking ride-on portion.

2. The optical connector according to claim 1, characterized in that the second movable member has a tip part where the functional portion is formed, and a basal portion provided with the locked part and an abutment surface, the second movable member hooking portion is composed of an abutment surface provided in a front part of an unlocking portion of the optical connector body, and a groove which is provided in the optical connector body and which the basal portion of the second movable member can go into and go out of, and when the second movable member is located at the unlocking position, the abutment surface of the second movable member abuts on the abutment surface of the second unlocking ride-on portion and, simultaneously, the basal portion of the second movable member goes into the groove, whereby the second movable member is inhibited from moving rearwardly of the unlocking position.

3. The optical connector according to claim 1, characterized in that the first unlocking ride-on portion of the first movable member is a protrusion-shaped unlocking ride-on portion, the second unlocking ride-on portion of the optical connector body is a protrusion-shaped ride-on portion provided in the optical connector body, the unlocking ride-on portion rides on the protrusion-shaped ride-on portion, whereby the locking part is lifted in an interlocked manner and dislodged from the locked part for release of locking, and the unlocking ride-on portion and the protrusion-shaped ride-on portion are disposed such that when the first movable member is located at the unlocking position, locking between the locking part and the locked part is released.

4. The optical connector according to claim 1, characterized in that the basal portion has a locking rear end part, and is structured such that rearwardly of the locking rear end part, the locking protrusion and the second movable member do not interfere with each other, a flat part is provided in one of or both of the unlocking ride-on portion and the protrusion-shaped ride-on portion, between a position where the first movable member is located at the unlocking position and a position where the locking protrusion is located rearwardly of the locking rear end part, the unlocking ride-on portion and the protrusion-shaped ride-on portion abut on each other at the flat part to maintain a state in which the unlocking ride-on portion rides on the protrusion-shaped ride-on portion, and to maintain a state in which locking between the first movable member and the second movable member is released.

5. The optical connector according to claim 1, characterized in that an elastic body is disposed between the optical connector body and the first movable member.

6. The optical connector according to claim 1, characterized in that the second movable member has a plate-shaped tongue piece which is a plate-shaped metal being a light blocking material and curved at a leading end of the plate-shaped metal, and which has a cleaning member stuck to an inside of the leading end thereof as the functional portion, the functional portion of the second movable member having a light blocking function and a dust-proof function.

7. The optical connector according to claim 2, characterized in that the first unlocking ride-on portion of the first movable member is a protrusion-shaped unlocking ride-on portion, the second unlocking ride-on portion of the optical connector body is a protrusion-shaped ride-on portion provided in the optical connector body, the unlocking ride-on portion rides on the protrusion-shaped ride-on portion, whereby the locking part is lifted in an interlocked manner and dislodged from the locked part for release of locking, and the unlocking ride-on portion and the protrusion-shaped ride-on portion are disposed such that when the first movable member is located at the unlocking position, locking between the locking part and the locked part is released.

8. The optical connector according to claim 2, characterized in that the basal portion has a locking rear end part, and is structured such that rearwardly of the locking rear end part, the locking protrusion and the second movable member do not interfere with each other, a flat part is provided in one of or both of the unlocking ride-on portion and the protrusion-shaped ride-on portion, between a position where the first movable member is located at the unlocking position and a position where the locking protrusion is located rearwardly of the locking rear end part, the unlocking ride-on portion and the protrusion-shaped ride-on portion abut on each other at the flat part to maintain a state in which the unlocking ride-on portion rides on the protrusion-shaped ride-on portion, and to maintain a state in which locking between the first movable member and the second movable member is released.

9. The optical connector according to claim 3, characterized in that the basal portion has a locking rear end part, and is structured such that rearwardly of the locking rear end part, the locking protrusion and the second movable member do not interfere with each other, a flat part is provided in one of or both of the unlocking ride-on portion and the protrusion-shaped ride-on portion, between a position where the first movable member is located at the unlocking position and a position where the locking protrusion is located rearwardly of the locking rear end part, the unlocking ride-on portion and the protrusion-shaped ride-on portion abut on each other at the flat part to maintain a state in which the unlocking ride-on portion rides on the protrusion-shaped ride-on portion, and to maintain a state in which locking between the first movable member and the second movable member is released.

10. The optical connector according to claim 2, characterized in that an elastic body is disposed between the optical connector body and the first movable member.

11. The optical connector according to claim 3, characterized in that an elastic body is disposed between the optical connector body and the first movable member.

12. The optical connector according to claim 4, characterized in that an elastic body is disposed between the optical connector body and the first movable member.

13. The optical connector according to claim 2, characterized in that the second movable member has a plate-shaped tongue piece which is a plate-shaped metal being a light blocking material and curved at a leading end of the plate-shaped metal, and which has a cleaning member stuck to an inside of the leading end thereof as the functional portion, the functional portion of the second movable member having a light blocking function and a dust-proof function.

14. The optical connector according to claim 1, characterized in that the optical connector body is an SC-type optical connector, and the optical connector body connects detachably from the optical connector.

15. The optical connector according to claim 1, characterized in that the second movable member opens/closes axially in a longitudinal direction.

16. The optical connector according to claim 13, characterized in that the second movable member opens/closes axially in a longitudinal direction.

17. The optical connector according to claim 1, characterized in that the first movable member is separate from the optical fiber, and the second movable member is separate from the optical fiber.

* * * * *